(12) United States Patent
Hong

(10) Patent No.: US 6,893,233 B2
(45) Date of Patent: May 17, 2005

(54) NOISE REDUCING CYLINDER ASSEMBLY FOR COMPRESSOR

(75) Inventor: Myung-jung Hong, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 0 days.

(21) Appl. No.: 10/207,261

(22) Filed: Jul. 30, 2002

(65) Prior Publication Data

US 2003/0095881 A1 May 22, 2003

(30) Foreign Application Priority Data

Nov. 21, 2001 (KR) .......................................... 2001-72553

(51) Int. Cl.⁷ ................................................. F04B 39/10
(52) U.S. Cl. ......................... 417/569; 137/856; 137/857
(58) Field of Search ................................. 417/560, 569, 417/571; 137/527, 856, 857

(56) References Cited

U.S. PATENT DOCUMENTS

| | | | | |
|---|---|---|---|---|
| 2,588,112 A | * | 3/1952 | Hanson | ........................ 137/69 |
| 4,184,508 A | * | 1/1980 | Mayer et al. | ............. 137/512.1 |
| 4,483,363 A | * | 11/1984 | Madoche et al. | ...... 137/329.04 |
| 5,647,395 A | | 7/1997 | Hashimoto et al. | ......... 137/517 |
| 2002/0098093 A1 | * | 7/2002 | Tomel et al. | ................ 417/312 |
| 2003/0066563 A1 | * | 4/2003 | Hong | ........................ 137/514 |

FOREIGN PATENT DOCUMENTS

| | | |
|---|---|---|
| CN | 2167897 Y | 6/1994 |
| CN | 1218142 A | 10/2000 |
| JP | 406147125 A * | 5/1994 |
| JP | 2000-291559 A | 8/1999 |

* cited by examiner

Primary Examiner—Charles G. Freay
(74) Attorney, Agent, or Firm—Blank Rome LLP

(57) ABSTRACT

A cylinder assembly for a hermetic compressor is capable of reducing impulse and noise that is generated by a contact of a valve plate and a suction valve when the suction valve is closed. The cylinder assembly has a cylinder block having a cylinder formed therein; a cylinder head connected to the cylinder block, for sealing the cylinder off from outside; a valve plate disposed between the cylinder block and the cylinder head, the valve plate having a refrigerant suction hole; a suction valve disposed at a side of the valve plate for resiliently opening and closing the refrigerant suction hole; and a noise/impulse reducing device disposed between the suction valve and the valve plate so that the noise/impulse reducing device first contacts with the suction valve prior to contacting with the valve plate. During the refrigerant compression in the cylinder, the impulse and noise, which is generated by the hitting movement of the suction valve 38a against the valve plate, is reduced.

4 Claims, 6 Drawing Sheets

NOISE REDUCING CYLINDER ASSEMBLY FOR COMPRESSOR

BACKGROUND OF THE INVENTION

1. Field of the Invention

The present invention relates to a cylinder assembly for a compressor that is used in refrigeration system like refrigerators, air conditioners, or the like.

2. Description of the Prior Art

Generally, a refrigeration system like refrigerators or air conditioners employ a hermetic compressor, and as shown in FIGS. 1 and 2, the hermetic compressor 10 includes an electric rotation driving unit 20 that has a rotor 21 and a stator 22, a cylinder assembly 30 that compresses refrigerant by the movement in association with the electric rotation driving unit 20 and then discharges the compressed refrigerant, and a casing 11 that houses the electric rotation driving unit 20 and the cylinder assembly 30.

The cylinder assembly 30 includes a cylinder block 31, a cylinder head 32 and a valve plate 35.

The cylinder block 31 has a cylinder 31a formed therein, the space in which the refrigerant is drawn in through a refrigerant suction passage. The refrigerant is compressed as the rotor 21 is rotated and a piston 25 is accordingly reciprocated within the cylinder 31a in a linear direction.

The cylinder head 32 is disposed at a side of the cylinder block 31 to seal an open end of the cylinder 31a. As the cylinder head 32 is connected to the cylinder block 31, a refrigerant suction chamber 37 and a refrigerant discharge chamber 36 are defined between the cylinder block 31 and the cylinder head 32. The refrigerant suction chamber 37 is connected with a refrigerant suction passage, while the refrigerant discharge chamber 36 is connected with a refrigerant discharge passage.

A valve plate 35 is disposed between the cylinder block 31 and the cylinder head 32, and has a refrigerant suction hole 35a and a refrigerant discharge hole 35b for connecting the cylinder 31a respectively to the refrigerant suction chamber 37 and the refrigerant discharge chamber 36.

The cylinder assembly 30 is provided with a suction valve 38a and a discharge valve 39 for selectively opening and closing the refrigerant suction hole 35a and the refrigerant discharge hole 35b while the piston 25 is driven. The operation of the suction valve 38a and the discharge valve 39 is depicted in detail in FIG. 2.

Referring to FIG. 2, as the piston 25 is moved to a lower dead end, refrigerant is drawn into the cylinder 31a. Here, the suction valve 38a is opened. Then as the piston 25 is moved to the upper dead end, the refrigerant is compressed. Here, the suction valve 38a is closed. As the pressure of the compressed refrigerant exceeds a certain point, the discharge valve 39 is opened, and the compressed refrigerant is discharged outside of the cylinder 31a.

In the conventional cylinder assembly constructed as above, the suction valve 38a is closed during the refrigerant compression, hitting against the valve plate 35 directly. The refrigerant in the cylinder 31a flows at a much lower temperature than the atmospheric temperature. Accordingly, the suction valve 38a is constantly subjected to the low temperature and impulses, and as a result, damages like cracks occur in the suction valve 38a, deteriorating the durability of the compressor 10. Still another problem is that the leading end of the suction valve 38a is hit against the valve plate 35 and causes a noise in the high frequency range.

SUMMARY OF THE INVENTION

The present invention has been made to overcome the above-mentioned problems of the prior art. Accordingly, it is an object of the present invention to provide a cylinder assembly for a hermetic compressor having an improved structure to reduce an impulse and noise occurring when the suction valve is closed.

The above object is accomplished by a cylinder assembly for a compressor according to the present invention, including a cylinder block having a cylinder formed therein; a cylinder head connected to the cylinder block, for sealing the cylinder off from outside; a valve plate disposed between the cylinder block and the cylinder head, the valve plate having a refrigerant suction hole; a suction valve disposed at a side of the valve plate for resiliently opening and closing the refrigerant suction hole; and a noise/impulse reducing device disposed between the suction valve and the valve plate such that the noise/impulse reducing device first contacts with the suction valve prior to contacting with the valve plate.

Since the suction valve hits against the noise/impulse reducing device prior to hitting the valve plate, shock or noise by the hitting movement of the suction valve against the valve plate is reduced.

According to the preferred embodiment of the present invention, the noise/impulse reducing device includes a supporting member protruding from the cylinder head toward the refrigerant suction hole for a predetermined distance; and a buffering member made of a resilient material and disposed at an end of the supporting member in a manner that an end thereof is passed through the refrigerant suction hole, the end of the buffering member being first contacted with the suction valve prior to contacting the valve plate when the suction valve is closed.

It is preferred that the noise/impulse reducing device additionally include a buffering pad disposed at an end of the buffering member that dampens the contact with the suction valve.

It is also preferred that a base muffler be disposed in a refrigerant suction chamber defined between the cylinder block and the cylinder head, and the supporting member be protruded from the base muffler to the refrigerant suction hole.

BRIEF DESCRIPTION OF THE DRAWINGS

The above-mentioned objects and the feature of the present invention will be more apparent by describing the preferred embodiment of the present invention in detail referring to the appended drawings, in which.

DETAILED DESCRIPTION OF PREFERRED EMBODIMENT

Figure 1:
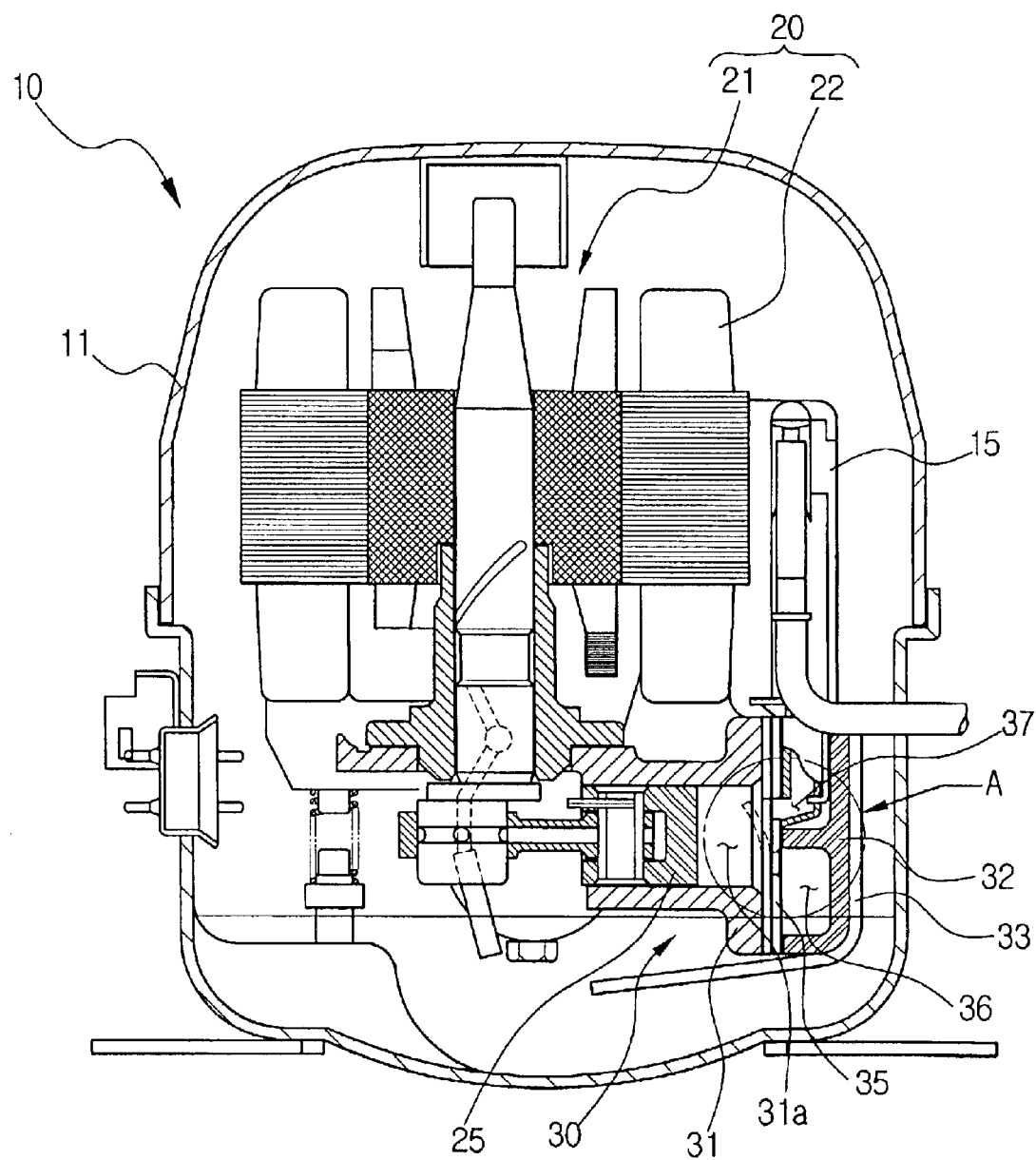
FIG. 1 is a sectional view schematically showing the structure of a conventional compressor.

The preferred embodiment of the present invention will be described in greater detail with reference to the accompanying drawings. In the drawings, the same reference numbers represent the same or similar elements in the different drawings whenever possible.

Throughout the description, the like elements with the same functions will be given the same reference numerals of FIGS. 1 and 2, and description thereof will be omitted.

Figure 3:
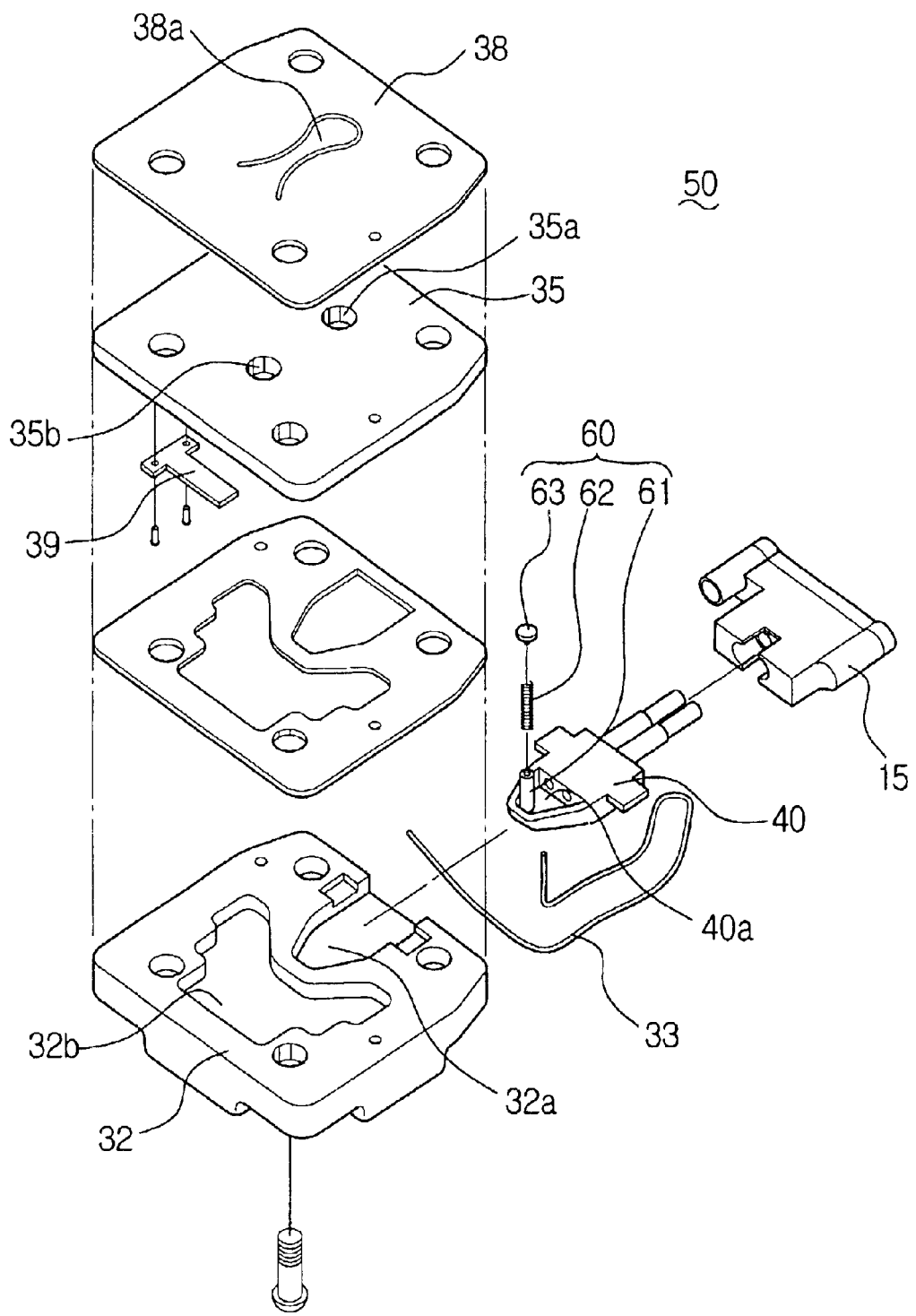
FIG. 3 is a perspective view schematically showing the structure of the cylinder assembly for a compressor according to a preferred embodiment of the present invention.

Referring to FIG. 3, a cylinder assembly 50 for a hermetic compressor 10 according to the present invention includes a cylinder block 31 (see FIG. 1), a cylinder head 32, a valve plate 35 and a noise/impulse reducing device 60.

The cylinder head 32 is connected by proper fasteners like a bolt, etc., and has a first and a second dent portions 32a and 32b formed in a side thereof for defining a refrigerant suction chamber 37 (see FIG. 1) and a refrigerant discharge chamber 36 (see FIG. 1) in association with the cylinder block 31.

Figure 2:
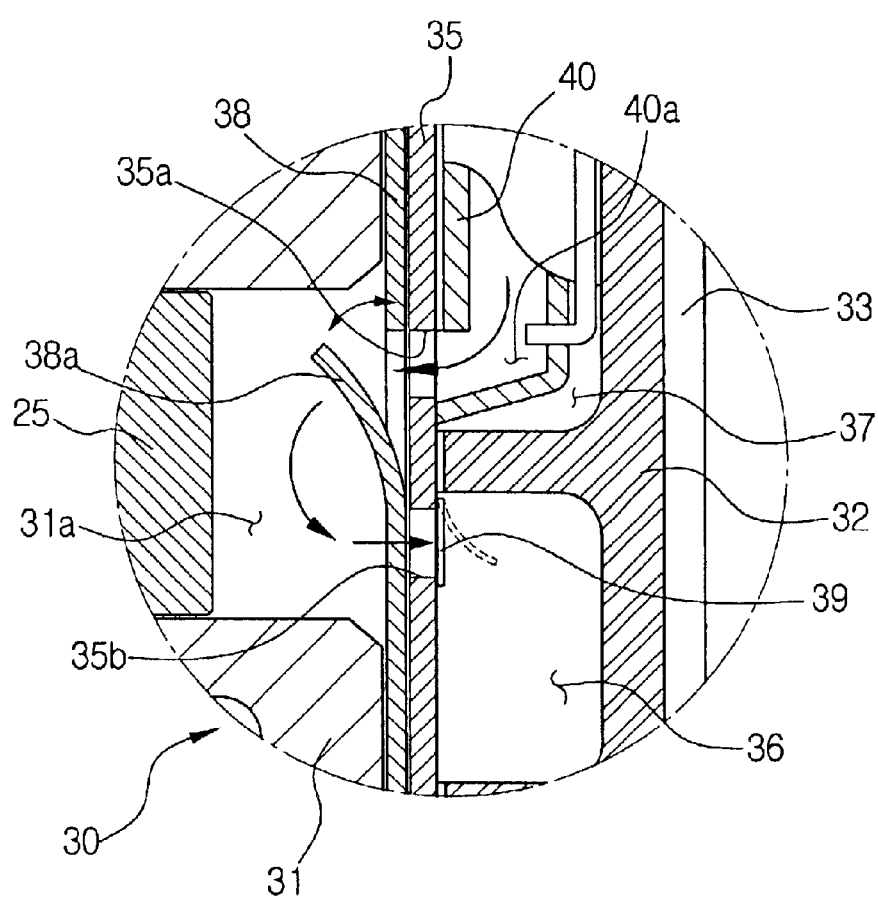
FIG. 2 is an enlarged view of a circle A of FIG. 1, to explain the operation of the conventional compressor.

The valve plate 35 has a refrigerant suction hole 35a and a refrigerant discharge hole 35b connected to a cylinder 31a (see FIG. 1). The refrigerant discharge hole 35b is opened and closed by a discharge valve 39 disposed at a side of the valve plate 35 that faces the cylinder block 31. Here, the discharge valve 39 is a plate spring. The refrigerant suction hole 35a is opened and closed by the suction valve 38a. In this embodiment, the suction valve 38a is formed as a certain portion of a suction valve sheet 38, which is connected to the cylinder-facing side of the valve plate 35, is cut away. For a flexible driving of the suction valve 38a during the movement of the piston 25, the suction valve 38a can be formed of resilient materials like plate spring, and also for the same purpose, it is preferred that the suction valve sheet 38 be formed of a thin iron sheet.

According to the preferred embodiment of the present invention, the cylinder head 32 is connected to the valve plate 35 and the cylinder block 31, after a base muffler 40 is disposed in the first dent portion 32a. The base muffler 40 has a space portion 40a that is connected to a suction muffler 15, an oil inflow pipe 33 and the cylinder 31a, and serves the function of guiding the flow of the refrigerant that has passed the suction muffler 15. The base muffler 40 can be omitted according to the type of the compressor 10.

The noise/impulse reducing device 60 is for reducing impulse and noise when the suction valve 38a is closed by its recovery force to hit against the valve plate 35 directly. The impulse/noise reducing device 60 includes a supporting member 61, a buffering member 62, and a buffering pad 63.

The supporting member 61 is protruded from an inner wall of the base muffler 40 toward the cylinder 31a. If the base muffler 40 is not employed, the supporting member 61 is directly protruded from the cylinder head 32.

The buffering member 62 is disposed at an end of the supporting member 61 such that an end of the buffering member 62 is passed through the refrigerant suction hole 35a. The buffering member 62 is protruded to a length that is sufficient for the end of the buffering member 62 to protrude through the refrigerant suction hole 35a toward the suction valve 38a for a predetermined distance when the suction valve 38a is opened. Although this embodiment employed a coil spring as the buffering member 62 by way of an example, any other member can be employed if it only absorbs the shocks that occur when the suction valve 38a is closed. Additionally, in order to prevent separation of the buffering member 62 from the supporting member 61 during the operation of the buffering member 62, various types and shapes of guide member (not shown) can be employed.

The buffering pad 63 acts as a dampener when the suction valve 38a is closed, and transmits the impact from the contact to the buffering member 62 by expanding the contact area between the suction valve 38a and the buffering member 62. The buffering pad 63 is disposed at an end of the buffering member 62 that is disposed at the supporting member 61, and accordingly, the buffering pad 63 is advanced into the refrigerant suction hole 35a resiliently by the buffering member 62. The buffering pad 63 and the supporting member 61 are disposed such that they are spaced from each other by a predetermined distance. Accordingly, when the buffering pad 63 is moved toward the cylinder head 32 of suction valve 38a, the buffering pad 63 does not contact the supporting member 61, due to the buffering member 62.

The operation of the cylinder assembly constructed as above according to the present invention will be described in greater detail below.

Figure 4A:
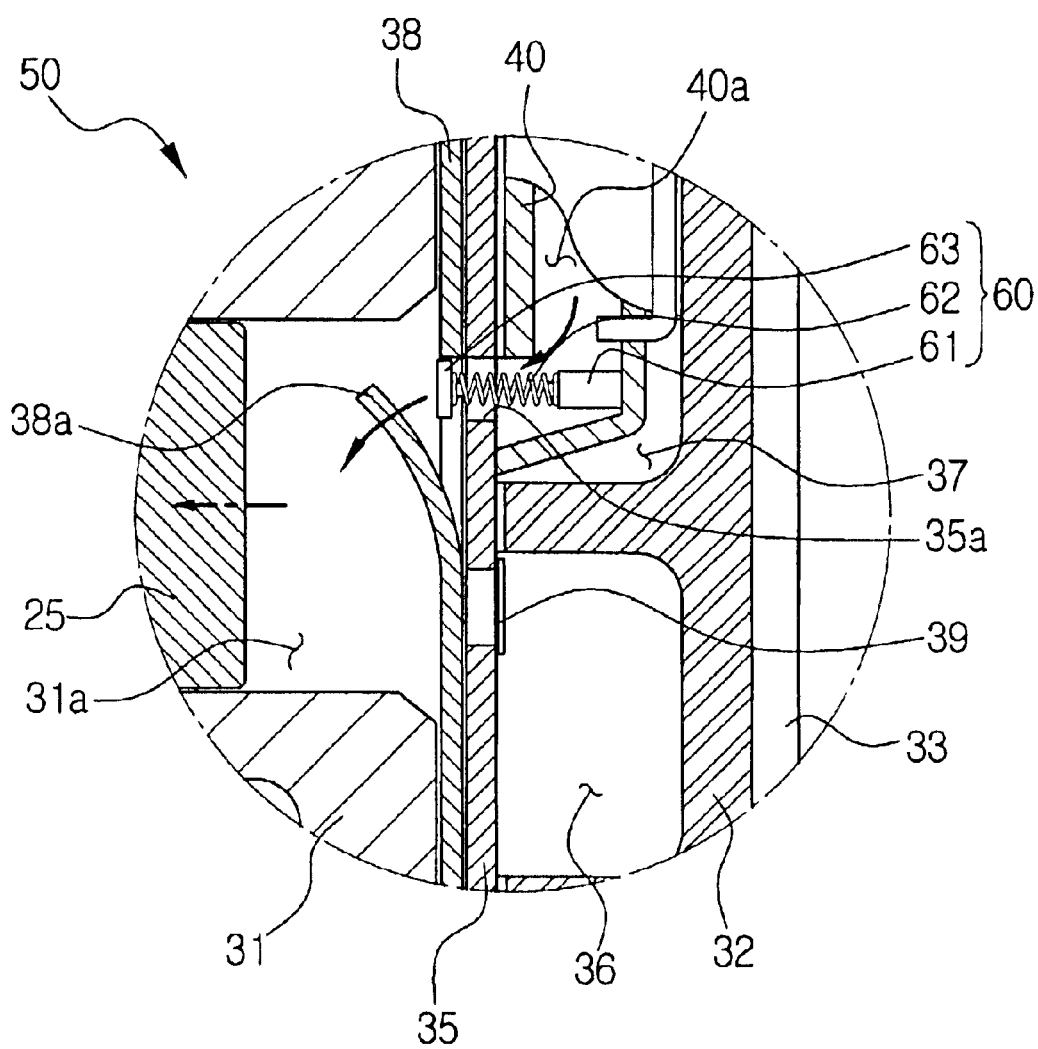
FIGS. 4A through 4C are sectional views showing the cylinder assembly during the operation of the compressor according to the present invention.

First, as shown in FIG. 4A, as the piston 25 is moved to the lower dead end, a vacuum is generated in the cylinder 31a. The refrigerant of the refrigerant suction chamber 37 is subjected to a tendency (indicated in arrows) toward the inside of the cylinder 31 through the refrigerant suction hole 35a due to the vacuum. Accordingly, the leading end of the suction valve 38a is moved toward the piston 25, opening the refrigerant suction hole 35a, and the refrigerant is drawn into the cylinder 31a through the opened refrigerant suction hole 35a. As the suction valve 38a is opened, the buffering member 62, which is in a contracted state, is expanded to be positioned beyond the refrigerant suction hole 35a in the direction toward the suction valve 38a by a predetermined distance.

Figure 4B:
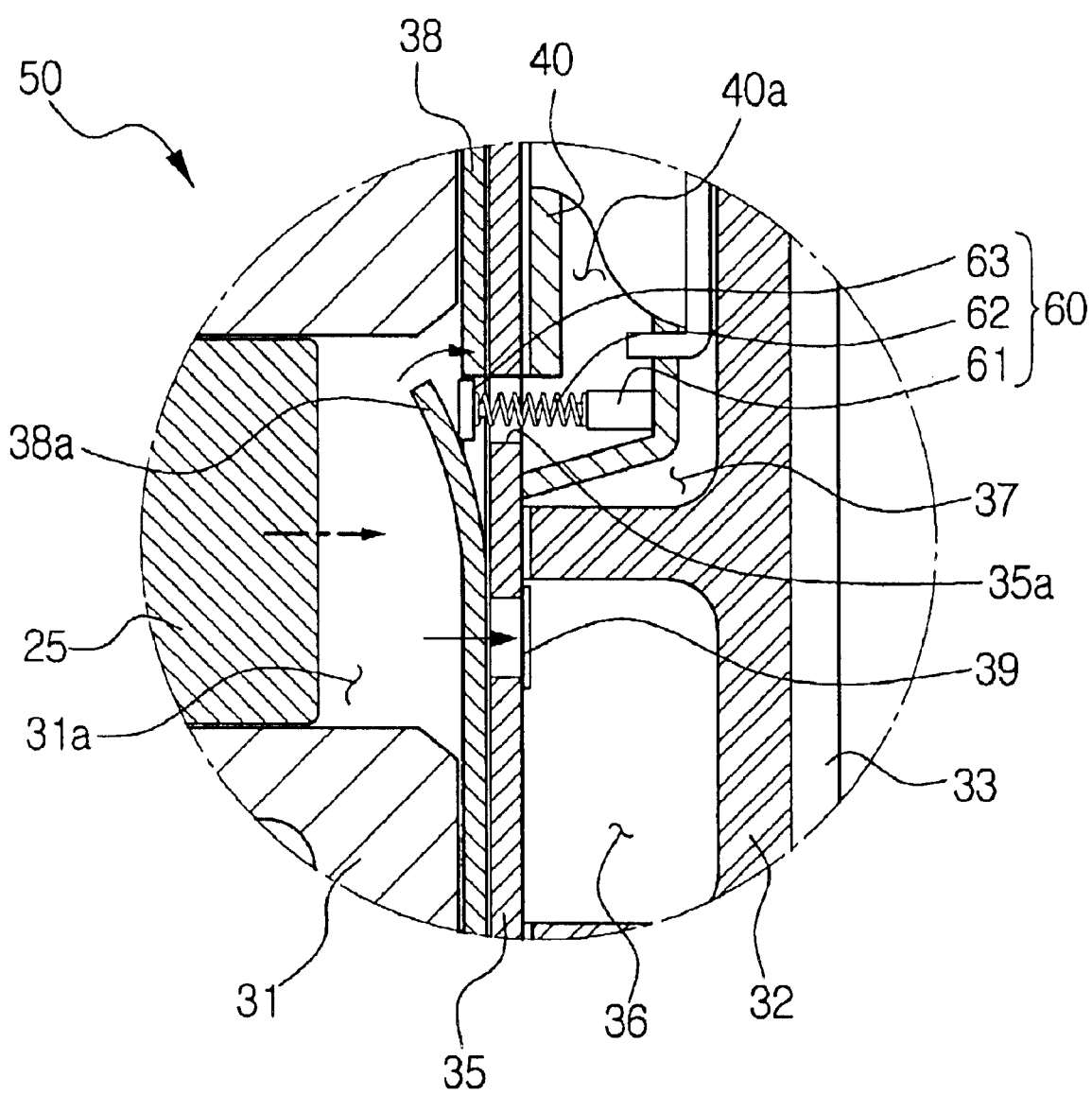

As shown in FIG. 4B, as the piston 25 reaches the lower dead end and then returns to the upper dead end, the refrigerant in the cylinder 31a is compressed by the piston 25. As the refrigerant is compressed, the suction valve 38a is closed by the pressure of the cylinder 31a and the recovery force of the suction valve 38a. At this time, before the suction valve 38a is contacted with the valve plate 35, the suction valve 38a is brought into a contact with the buffering pad 63 that is protruded from the refrigerant suction hole 35a toward the piston 25 for a predetermined distance.

Figure 4C:
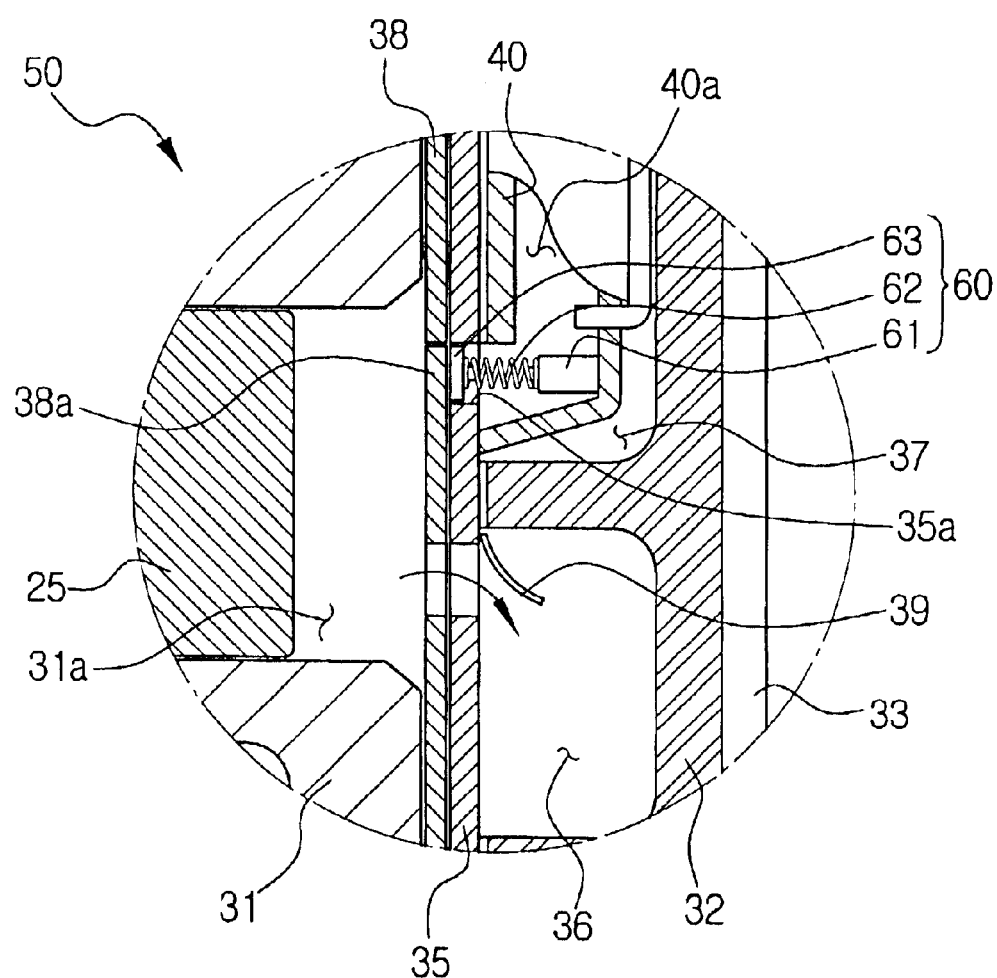

After hitting against the buffering pad 63, the suction valve 38a is contacted with the valve plate 35 (see FIG. 4C), overcoming the recovering force of the buffering member 62. The buffering pad 63 is received in the refrigerant suction hole 35a of valve plate 35. Accordingly, the refrigerant suction hole 35a is closed. At this time, the buffering pad 63 is moved toward the cylinder head 32 by the suction valve 38a. As the buffering pad 63 is moved, the buffering member 62 is forced to contract. The contracted buffering member 62 absorbs the shock that occurs when the suction valve 38a is closed. Since the shock is absorbed by the buffering member 62 before the suction valve 38a hits against the valve plate 35, noise generated from the contact of the valve plate 35 and the suction valve 38a is reduced. According to the preferred embodiment of the present invention, the effect of noise reduction is particularly good in the high frequency range of 3.15 to 4 kHz.

According to the present invention, the suction valve 38a hits against the valve plate 35 with reduced force since it is after the suction valve 38a hits the buffering pad 63. Since the shocks that occur by the contact of the suction valve 38a and the valve plate 35 is reduced, damages to the suction valve 38a or the valve plate 35 can be checked, and as a result, the durability of the compressor 10 increases.

According to the present invention, another advantage is also guaranteed. That is, the noise by the hitting movement of the suction valve 38*a* to the valve plate 35 is reduced, and accordingly, the compressor is driven more quietly.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A cylinder assembly for a compressor, comprising:
   a cylinder block having a cylinder formed therein;
   a cylinder head connected to the cylinder block for sealing the cylinder;
   a valve plate disposed between the cylinder block and the cylinder head, the valve plate having a refrigerant suction hole;
   a suction valve disposed at a side of the valve plate for resiliently opening and closing the refrigerant suction hole; and
   a noise/impulse reducing device disposed between the suction valve and the valve plate and being separable from said suction valve such that the noise/impulse reducing device contacts the suction valve prior to the suction valve contacting the valve plate with a portion of the noise/impulse reducing device being received in the refrigerant suction hole when closing the refrigerant suction hole.

2. The cylinder assembly of claim 1, wherein
   the noise/impulse reducing device includes a supporting member protruding toward the refrigerant suction hole for a predetermined distance; and
   a buffering member made of a resilient material and disposed at an end of the supporting member so that an end thereof passes through the refrigerant suction hole, the end of the buffering member being first contacted with the suction valve prior to contacting the valve plate when the suction valve is closed.

3. The cylinder assembly of claim 2, wherein the noise/impulse reducing device further comprises a buffering pad disposed at an end of the buffering member for dampening the contact between the suction valve and the valve plate.

4. The cylinder assembly of claim 2, further comprising a base muffler disposed in a refrigerant suction chamber that is defined between the cylinder block and the cylinder head, and the supporting member is protruded from the base muffler to the refrigerant suction hole.

* * * * *